(12) United States Patent
Kametani et al.

(10) Patent No.: US 6,450,900 B2
(45) Date of Patent: *Sep. 17, 2002

(54) MARKED GOLF BALL AND METHOD FOR MARKING A GOLF BALL

(75) Inventors: Ryuhei Kametani, Osaka (JP); Takashi Ohira, Chichibu (JP); Susumu Muta, Chichibu (JP)

(73) Assignees: Kametani Sangyo Kabushiki Kaisha, Osaka-Fu (JP); Bridgestone Sports Co., Ltd., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 12 days.

(21) Appl. No.: 09/310,988

(22) Filed: May 12, 1999

(30) Foreign Application Priority Data

May 14, 1998 (JP) ............................................. 10-131702

(51) Int. Cl.⁷ ........................... A63B 37/04; A63B 37/06
(52) U.S. Cl. ........................... 473/377; 101/33; 101/35; 101/DIG. 40; 106/20; 106/403; 106/415; 106/417; 273/213; 273/218; 273/233; 273/235; 473/378
(58) Field of Search ...................... 101/35, 33, DIG. 40; 106/20, 403, 415, 417; 273/213, 218, 233, 235; 473/377, 378

(56) References Cited

U.S. PATENT DOCUMENTS

| | | | | | |
|---|---|---|---|---|---|
| 4,679,794 A | * | 7/1987 | Yamada | .................. | 273/235 R |
| 4,679,795 A | * | 7/1987 | Melvin | .................... | 273/235 R |
| 4,865,326 A | * | 9/1989 | Isaac | ....................... | 273/235 A |
| 5,007,647 A | * | 4/1991 | Gulick | ....................... | 273/213 |
| 5,018,742 A | * | 5/1991 | Isaac | ....................... | 273/235 A |
| 5,029,870 A | * | 7/1991 | Concepcion | ........... | 273/235 A |
| 5,427,378 A | * | 6/1995 | Murphy | .................. | 273/235 A |
| 5,607,808 A | * | 3/1997 | Nishizawa | ................. | 430/137 |
| 5,672,200 A | * | 9/1997 | Heinz | ......................... | 106/403 |
| 5,697,715 A | * | 12/1997 | Kuroda | ....................... | 400/237 |
| 5,743,180 A | * | 4/1998 | Arnke | ......................... | 101/35 |
| 5,878,659 A | * | 3/1999 | Hatter | ......................... | 101/35 |
| 5,878,670 A | * | 3/1999 | Yamaguchi | ................. | 101/492 |
| 5,898,043 A | * | 4/1999 | Uemae | ........................ | 523/204 |

FOREIGN PATENT DOCUMENTS

| | | | | |
|---|---|---|---|---|
| JP | 53-63137 | | 6/1978 | ........... A63B/37/14 |
| JP | 8-047551 | * | 2/1996 | |
| JP | 8-155052 | * | 6/1996 | |
| JP | 11-114093 | | 4/1999 | ........... A63B/37/00 |
| JP | 11-115391 | | 4/1999 | ............. B44C/1/17 |

* cited by examiner

Primary Examiner—Peter Vo
Assistant Examiner—Paul Kim
(74) Attorney, Agent, or Firm—Sughrue Mion, PLLC

(57) ABSTRACT

A golf ball is provided which bears a mark having a distinct appearance unrealizable by only changing in tint. Ink can be prepared by mixing one or more than two components which can afford luster such as pearl particles, shell particles, mica particles and the like in an ink medium. Thereafter the ink can be used for marking the surface of the golf ball by an indirect printing used with a transfer printing film or a direct printing such as a pad printing, a screen printing and the like. The composition of the ink is 5 to 150 parts by weight of the mica, pearl particles and the like. The mica, the pearl particles and the like are employed for flat forms.

7 Claims, No Drawings

MARKED GOLF BALL AND METHOD FOR MARKING A GOLF BALL

FIELD OF THE INVENTION

The present invention relates to a marked golf ball and a method for marking a golf ball. More particularly, it relates to an improvement in an appearance of a golf ball having a mark superior in metallic luster as well as durability.

BACKGROUND OF THE INVENTION

In general, a golf ball is marked with a pattern consisting of letters, numerals, a trade name, a logotype, and the like with a single or multiple color. As a method for marking golf balls, various techniques known including a direct printing technique as typified by a pad printing technique, a transfer printing technique stamping a solid transfer printing film with a die, a thermal transfer printing technique using a transfer printing film having a desired pattern of transfer ink layer on a base film, as disclosed in Japanese Patent Application Kokai No. 63137/1978. Other miscellaneous transfer printing techniques which do not employ thermal transfer printing technique have also been used. As ink used in such a marking method, printing ink has been widely used which is a mixture of an organic or inorganic pigment and an ink medium.

In recent years, customers' tastes have been diversified and consequently customers have been in want of golf balls which are distinct from others in a golf ball market. More particularly, for the marking of the golf balls, there are needs of the golf ball having a mark distinct and excellent in an appearance. Therefore, providing such a golf ball will attract customer interest and contribute to stimulate the golf ball market.

However, since conventional printing ink used for the marking can only adjust hue by changing a ratio of pigments, such printing ink cannot have been sufficiently agreeable to the golf ball market needs.

Considering the golf ball is mainly used outdoor in day, the mark of the golf ball may be more desirable which shines notably under the sunlight and is clearly distinguished from others during playing golf.

As the golf ball is characterized by use outdoor, ink can be prepared containing metal particles such as aluminum particles, copper particles and the like, and a metallic mark with such ink may be applied to the golf ball in order to obtain the mark having luster under the sunlight. However, as an ink varnish (resin) is generally not compatible with the metal particles, such ink is inferior in compatibility, mixing ability, and dispersive ability and is difficult to be uniformed. Therefore, such ink is difficult to be prepared and consequently adjusted precisely to printing conditions. Both a direct printing and a transfer printing to the ball cause a problem so that an excellent result cannot be provided. Especially, for a transfer printing technique, a pattern is printed on a base film such as a polypropylene film, thereafter the pattern is transferred by hot-pressing to a surface of the golf ball. Consequently, a poor aptitude for printing happens twice when the pattern is printed to the base film and the pattern is transferred to the golf ball as described above. As a result, dissatisfaction is increased because of the influences of such a poor aptitude of printing.

Even if the mark can be printed on the surface of the golf ball with the ink containing the metal particles, such a mark generally tends to be chipped because of incompatibility between the ink varnish and the metal particles and tends to be inferior in durability to a mark of the golf ball with the conventional ink in the present situation.

As a result of earnest studies to develop a golf ball which has an appearance unrealizable by only changing the tint, preferably a method for marking the golf ball with a mark having an excellent appearance by reflecting sunlight and the like and the golf ball having such a mark, the present inventors conceived of the present invention in consideration of this situation.

SUMMARY OF THE INVENTION

In a preferred mode of the present invention, a golf ball is provided having a mark of desired pattern applied with an ink composition containing a component which can afford to develop luster.

The ink composition contains 15 to 250 parts by weight of the luster developing component relative to 100 parts by weight of an ink resin.

The ink composition contains 5 to 150 parts by weight of the luster developing component relative to 100 parts by weight of an ink medium. The ink medium is an intermediate of printing ink and has a sufficiently printable function as ink by only coloring the ink medium. In general, the ink medium contains an ink resin, a plasticizer, a filling material such as an extender pigment and a filler, a solvent and the like.

For the golf ball having a mark superior in light reflectiveness as well as durability, the luster developing component as described above is a flake or scale-like, crystalloid or non-crystalloid nucleus coated with a light reflective material.

In a preferred mode of the present invention, the nucleus is a mica, the light reflective material is metal oxide or metal nitride, and suitably the metallic oxide is an iron oxide.

On the other hand, for a method of marking a mark of a desired pattern on a surface of the golf ball, the ink composition is produced by mixing the luster developing component and the ink medium, then the ink composition is applied on the surface of the golf ball.

For such a method as described before, the ink composition is applied in the desired pattern on a base film for a transfer printing film to form an ink layer on the base film, thereafter the ink layer is positioned on the golf ball surface, then the ink layer is hot-pressed against the golf ball to transfer the ink layer to the golf ball surface.

The ink composition is applied in the desired pattern on a printing plate for a pad printing, thereafter the ink composition is adhered to the pad by pressing the pad to the printing plate. Thereafter, the pad is pressed to the golf ball surface to transfer the ink composition to a surface of the golf ball.

The desired pattern on the printing plate for a screen printing is formed, then the printing plate is faced to the golf ball surface. Thereafter, the ink composition is squeegeed on the printing plate to transfer the ink composition to a surface of the golf ball.

BEST MODE FOR CARRYING OUT THE INVENTION

According to the preferred mode of the present invention, the luster of the marking of the golf ball is enhanced, and consequently, the luster is excellent because the marking consists of the ink composition incorporating the luster developing component. As a result, the golf ball has the distinct appearance from the conventional golf balls, which cannot be provided by only changing tint.

The degree of the luster is varied according to the reflected amount of incident light. Therefore, when such a golf ball is used under the sunlight in day, the appearance is notably enhanced and clearly distinguished from others.

In this case, the ink composition contains 15 to 250 parts by weight of the luster developing component relative to 100 parts by weight of the ink resin. The luster developing component with less than 15 parts by weight gives rise to only unsatisfactory effect of an increase in luster, whereas even the luster developing component exceeding 250 parts by weight decreases the adhesion of the ink layer against the surface of the golf ball.

An amount of the luster developing component is more preferably 20 to 150 parts by weight, and most preferably 30 to 100 parts by weight relative to 100 parts by weight of the ink resin.

On the other hand, the ink composition contains 5 to 150 parts by weight of the luster developing component relative to 100 parts by weight of the ink medium. A luster developing component with less than 5 parts by weight gives rise to only unsatisfactory effect of the increase in luster, whereas a luster developing component exceeding 150 parts by weight decreases the adhesion of the ink layer against the surface of the golf ball.

The amount of the luster developing component is more preferably 10 to 80 parts by weight, and most preferably 20 to 60 parts by weight relative to 100 parts by weight of the ink medium.

The present invention, relates to the mark on the surface of the golf ball. In the present situation, the luster developing component is not incorporated in a paint layer coating a circumference of the golf ball, but incorporated in the ink used to print a mark on a part of the golf ball surface as the desired pattern and the thermal printing technique has been used for marking of the golf ball. In consideration of present invention, the ink medium containing the luster developing component is preferably adapted to a thermoplastic resin such as a chief material (base resin) in the present invention, but it is needless to say that the ink medium is not restricted to the thermoplastic resin.

As the luster developing component, a slice-like or scale-like, crystalloid or non-crystalloid nucleus coated with a light reflective material can be used.

Examples of the slice-like or scale-like nucleus include mica, glass flake, $BaSO_4$, $SiO_2$, many kinds of ceramics and so on. More particularly, mica is adequately used.

As the light reflective material on the surface of the nucleus miscellaneous metallic oxide or metallic nitride are preferably used, more preferably iron oxide and $TiO_2$. The iron oxide is most preferably used between these two metallic oxides.

As the iron oxide, both a ferrous compound and a ferric compound are capable to be used, more particularly, use of $Fe_2O_3$ yields the excellent light reflectiveness.

As for the method for marking the golf ball, the marking of the golf ball is applied with the ink composition containing the luster developing component, thereby the luster is enhanced and consequently the luster is excellent as mentioned above. As a result, the golf ball has the distinct appearance from the conventional golf balls, which cannot be provided by only changing tint.

The degree of the luster is changed by the reflected amount of the incident light. Therefore, when such a golf ball is used under the sunlight in day, the appearance thereof is notably enhanced and clearly distinguished from others as described above.

In this case, for the same reason as mentioned above, the ink composition preferably contains 15 to 250 parts by weight of the luster developing component relative to 100 parts by weight of the ink resin and 5 to 150 parts by weight of the luster developing component relative to 100 parts by weight of the ink medium.

According to the methods for marking on the surface of the golf ball with the ink composition, a thermal transfer printing technique with transfer printing film, a pad printing technique with a transfer pad, and a screen printing technique can be employed.

It is not restricted to the thermal transfer printing technique, miscellaneous transfer printing techniques used with the transfer printing film except the thermal transfer printing technique may be adopted which marks on the surface of the golf ball by transfer with the ink layer. For example, a technique for transferring the ink layer by pressing under no heat.

The pad printing technique and the screen printing technique are direct printing techniques marking directly on the surface of the golf ball, whereas a technique for marking with a transfer printing film is an indirect printing technique forming the ink layer of the desired pattern on the base film. In this case, the method for forming the ink layer of the desired pattern on the base film, such as the screen printing technique, the gravure printing technique, the pad printing technique can be used.

According to the present invention as described above, the marking on the surface of the golf ball is applied with the ink composition containing the luster developing component. As the luster in a preferred mode of the invention, a pearl luster, a marbling luster, a mica-like luster and the like are preferably soft and tender. The luster with iris such as iridescence is also recommendable because of the change in tint according to viewing angles. As the luster developing component, when the pearl luster or the marbling luster is developed from the luster developing component, a powder of creature tissue, a powder of mineral structure such as mica, and a synthetic pearl pigment are preferably used. Examples of the powder of the creature tissue include a pearl powder, a shell powder, a scale powder, and the like. One or a mixture of more than two selected from the above is also available.

On the other hand, according to the present invention as described above, a metallic marking possessed with excellent metallic luster of the light reflectiveness can be obtained. In this case, the marking is more superior in the light reflectiveness as well as durability. As the luster developing component, the surface of the slice-like or scale-like, and crystalloid or non-crystalloid nucleus coated with a thin layer of miscellaneous metallic oxide or metallic nitride is preferably used. Examples of such a nucleus include mica, glass flake, $BaSO_4$, $SiO_2$, many kinds of synthetic ceramics and so on. For such metallic materials, iron oxide ($Fe_2O_3$) and $TiO_2$ are preferably used. The $Fe_2O_3$ is most preferably used between these two metallic oxide because of the excellent luster.

Such a luster developing component as described above is different from common metal particles in that the luster developing component is highly compatible with the ink resin, does not spoil printing work ability in a printing process, and does not lower the durability of the marking after the marking is printed. Especially, when the pigment consisting of the mica coated with the iron oxide is employed, the metallic luster as well as the phenomenon that the tint is changed subtly according to the viewing angles is recognized by an interference effect between the reflected light from the surface of the iron oxide and the reflected light from the surface of the mica through the iron oxide layer. Such a change in tint is influenced by the thickness of the coating layer of the nucleus, in this case, the thickness of the iron oxide layer.

However, when the thickness of the iron oxide layer is 40 to 60 nanometers, the change in tint is hardly recognized and golden luster is obtained by the reflected light from the iron oxide. When the thickness of the iron oxide layer is 60 to 80 nanometers, yellow hues add to the golden luster. When the thickness of the iron oxide layer is 80 to 100 nanometers, red hues add to the golden luster. When the thickness of the iron oxide layer is 100 to 160 nanometers, blue or green hues add to the golden luster. Therefore, when the metallic lustered mark having the strong light reflection is obtained, the thickness of the iron oxide layer around the mica is suitably 40 to 60 nanometers.

The titanium oxide layer may be located between the mica as the nucleus and the iron oxide layer as the chief material coating the surface of the mica. In this case, the golden metallic luster is controlled and the effect of the tint can be enhanced. As the titanium oxide used in this case, the titanium oxide may be a rutile type and an anatase type and the titanium oxide colored in advance by a color pigment may be adopted.

The effect of the change in tint influenced by the thickness of the titanium oxide layer is comparable to that of the change in tint influenced by the thickness of the iron oxide layer. Therefore, when the mica as the nucleus is coated with the multiple layers of the metallic oxide as described above, the change in tint is considered by an addition to the thickness of each layer and effect of the each layer. For example, when the thickness of the two layers of iron oxide layer and titanium oxide layer is 40 to 60 nanometers, the change in tint is hardly recognized and golden luster is obtained by the reflected light from the iron oxide. When the thickness of the two layers of iron oxide layer and titanium oxide layer is 60 to 80 nanometers, yellow hues add to the golden luster. When the thickness of the two layers of iron oxide layer and titanium oxide layer is 80 to 100 nanometers red hues add to the golden luster. When the thickness of the two layers of iron oxide layer and titanium oxide layer is 100 to 160 nanometers, blue or green hues add to the golden luster. Therefore, when the metallic lustered mark the enhanced light reflection is obtained, the thickness of the iron oxide layer around the mica is recommendable to 40 to 60 nanometers. This result is well accordance with the result by the iron oxide as described above.

For the luster developing component, for example, products commercially available from Merck Ltd. under a trade name of "Iridion®" can be used.

In a preferred mode of the present invention, the luster developing component such as the pigment having the light reflectiveness as described above is preferably flat form because the more visual beauty is expressed by equalizing the angles of the reflected light, the more the luster developing component is flat.

The average thickness of the luster developing component is preferably not more than 5 micrometers. If the average thickness exceeds 5 micrometers, the marking yields unevenness easily. Preferably, the average diameter is 0.1 to 5 micrometers, more preferably 0.4 to 1 micrometers Furthermore, the maximum diameter of the luster developing component is preferably about 1 to 200 micrometers, more preferably 5 to 100 micrometers. If the diameter of the luster developing component is less than 1 micrometer, it is difficult to develop the excellent luster of the marking. If the diameter of the luster developing component exceeds 200 micrometers, it is difficult to disperse uniformly the luster developing component in the ink composition and consequently to smooth the surface of the marking. Preferably, the average diameter is 10 to 60 micrometers, more preferably 10 to 50 micrometers.

When the ink composition is created by mixing the ink medium and the luster developing component, the luster developing component is agitated and dispersed so as not to be crushed finely. If the luster developing component is crushed finely, the average thickness and diameter thereof are deviated from the above-mentioned preferable range of the thickness and diameter.

In this case, the pigment may be incorporated in the ink composition in order to regulate the color of the marking. As far as the pigment is concerned, any of known pigments can be employed which have been used in the conventional printing ink for use in the marking. In particular, transparent organic pigments are preferably used because of their high brightness that enhances a luster improve effect in the ink or marking. Examples of such a transparent organic pigment include isoindolinone as yellow pigment, perylene as red pigment, phthalocyanine blue as blue pigment, and the like.

Other pigments expect the light reflective pigment as mentioned above may be incorporated in the ink composition. Examples of other pigments include common organic and inorganic coloring agents such as pigments or dyes, fluorescent pigments, metallic pigments, silica and so on. One or a mixture of more than two selected from the above pigments may be mixed to a desired color. These pigments may be incorporated in the single ink together with the light reflective pigment, or in the other ink layer arranged adjacent to the ink layer containing the light reflective pigment. Since the light reflective pigment of the present invention does not have a high suppressive force, when the ink layer containing the light reflective pigment is arranged to the outer layer and the other ink layer containing the other pigment except the light reflective pigment is arranged to the inner layer, the tint from all ink layers is changed by the influence of the color developed from the inner layer. In this case, the tint developed to the surface is also simultaneously influenced by the interference effect of the light from the outer ink layer. Therefore, the tint as described above is not necessarily in accordance with a mixture of the tints developed from each ink layer or the color developed from the inner ink layer. On the other hand, when the ink layer containing the light reflective pigment is arranged to the inner layer and the other ink layer containing the other pigment except light reflective pigment is arranged to the outer layer, the outer layer as the high transparent ink layer containing dies and the like having the small suppressive force, thereby, as all ink layers, the inner ink layer does not fail the light reflectiveness and various tints can be added. As a result, such an arrangement is suitable.

Therefore, the ink composition employed in the present invention may be printed on the surface of the golf ball with a single layer or more than two layers by dividing.

Examples of the ink as a base resin include a vinyichloride-vinylacetate copolymer, a vinylchloride-vinylacetate-vinyl alcohol copolymer, a urethane resin, a polyester resin, a polyethylene imine resin, a polyamide resin, an acrylic resin, a chloric polyolefin resin, a nitrocellulose and the like. When the ink is created, the ink resin, a plasticizer, a filled material such as a filler and an extender pigment, a solvent and the like are added. In this case, the ink resin is preferably colorless and transparent so that when the light reflective pigment is mixed, the luster developed from the light reactive material and the tint effect developed by the interference effect are made not to decrease.

When the mark to the golf ball is printed with a transfer printing film, the transfer printing film can be produced by applying the ink compositions to a polypropylene film, a biaxially oriented polypropylene film, a laminate film of a polypropylene film or a biaxially oriented polypropylene film and a glassine. As the base resin used in such a transfer printing technique, the thermoplastic resin is employed. Preferably, the vinylchloride-vinylacetate copolymer, the vinylchloride-vinylacetatevinyl alcohol copolymer, the thermoplastic urethane resin, the polyester resin, polyethylene imine resin, the polyamide resin and the like can be used. Mixture of more than two selected from the above is also capable to be used. As a method for forming the ink layer of the desired pattern on the base film, the screen printing technique and the gravure printing technique are generally indicated. In this case, the amount of the ink resin is small in the ink medium since the ink viscosity is set lowered. Preferably, the amount of the ink resin in the ink medium is 15 to 45 weight %. Therefore, in the ink for such a screen printing and gravure printing, the amount of the luster developing component is preferably about 5 to 80 parts by weight relative to 100 parts by weight of the ink medium. The luster developing component with less than 5 parts by weight gives rise to only unsatisfactory effect of an increase in luster, whereas even the luster developing component exceeding 80 parts by weight decreases the adhesion of an ink layer against a surface of the golf ball. The compound amount of the luster developing component is more preferably 10 to 40 parts by weight, and most preferably 20 to 30 parts by weight relative to 100 parts by weight of the ink medium. Preferably the thickness of the ink layer on the base film is regulated so that the thickness of the ink layer when transferred to the golf ball turns to be 1 to 8 microns.

Transfer of the mark to the golf ball can be carried out by positioning the mark in the transfer printing film in a marking portion on the golf ball followed by pressing the film against the ball under a temperature of ca. 90 to 150° C., or 150 to 180° C., thereafter removing the base film.

Optionally, a clear coat may be applied over the transferred mark.

The mark is applicable to any kind of golf balls including thread wound ball and solid golf ball.

EXAMPLE

Examples of the present invention are given below by way of illustration and not by way of limitation. All parts and percentages are by weight unless otherwise indicated.

For marking transfer printing films A to M (Examples), ink compositions were prepared by mixing the components as shown in Table 1. On biaxially oriented polypropylene films having a thickness of 20 microns, circles, as transfer pattern, were printed solidly in 15 millimeters diameter and 2 microns thick with each ink composition by means of a screen printing technique, gravure printing technique or pad printing technique to obtain the films A to M.

On the other hand, for transfer printing film N to V (Comparative Examples), ink compositions were prepared by mixing the components as shown in Table 2, wherein luster developing components are not incorporated in the ink compositions for Comparative Examples P and T, luster developing components are less incorporated in the ink compositions for Comparative Examples N and R, luster developing components are much incorporated in the ink compositions for Comparative Examples O, S and V, and aluminum paste (aluminum powder dispersed in solvent) is incorporated in the ink compositions for Comparative Examples Q and U. For the luster developing components, a product commercially available from Merck Ltd. under a trade name of "Iriodin®" 522 (a particle consisting of mica coated by iron oxide and having an average diameter of 5 to 25 micrometer), "Iriodin®" 500 (a particle consisting of mica coated by iron oxide and having an average diameter of 10 to 60 micrometer), and "Iriodin®" 530 (a particle consisting of mica coated by iron oxide and having an average diameter of 10 to 125 micrometer) were used. In printing technique items, the abbreviation "sc" stands for the screen printing technique, the abbreviation "gr" stands for the gravure printing technique, and the abbreviation "pa" stands for the pad printing technique.

Necessary number of two-piece golf balls were provided, each having a core enclosed in a cover material of 2 millimeters thick. The core was made of cross-linked synthetic rubber including polybutadiene rubber as a main component. The cover material, having a Shore D hardness of 65, was made of ionomer resin as a main component. Each ball was plasma treated on the surface.

The pattern of the circle was thermal transferred to the golf ball surface by pressing each film A to V against the ball by a silicone pad for 1 second under 120° C. As Reference Example, a golf ball having a mark in the same form as above pattern was made by stamping an aluminum vacuum evaporation coated film W with a die.

At this stage, it was evaluated by a visual observation whether the mark of the circle was completely transferred to the ball surface. Color tone and a degree of luster in the mark were also evaluated by a visual observation. The results are shown in Tables 3 and 4, wherein for transferability the symbol "O" stands for excellent and the symbol "Δ" stands for transfer with some portions remained untransferred, and for tone and luster the symbol "O" stands for brilliant and lustered, the symbol "X" stands for no luster, the symbol "Δ" stands for less lustered and the symbol "□" stands for lustered.

On the thus marked golf balls, a two-component reactive clear urethane paint was spray coated, dried, and cured. Thereafter, the resulting golf balls were examined by the following tests to access durability of the marks.

Impact test

The ball was hit 200 times repeatedly by #1 wood with a club head velocity of 45 meters per second toward a fabric-made target. A degree of damage on the mark was evaluated by a visual observation according to the following criteria:

O: no damage

Δ: some portions chipped

Sand abrasion test

The ball was stirred for 2 hours in a porcelain ball mill with sand used for bunker in a golf course. A degree of wear and tear of the mark and damage on the mark were evaluated by a visual observation according to the following criteria:

O: the same as before test, no wear and tear, no chipping

Δ: some portions worn and chipped

Sand/water abrasion test

The ball was stirred for 2 hours in a porcelain ball mill with sand used for bunker in a golf course and water in equal amount of the sand. A degree of wear and tear of the mark and damage on the mark were evaluated by a visual observation according to the following criteria as the above sand abrasion test.

The results of these durability tests are shown in Tables 3 and 4.

TABLE 1

| | Example | | | | | | | | | | | | |
|---|---|---|---|---|---|---|---|---|---|---|---|---|---|
| Transfer printing film | A | B | C | D | E | F | G | H | I | J | K | L | M |
| Type of printing | sc | sc | sc | sc | sc | sc | gr | gr | gr | gr | gr | gr | pa |
| Vinylchloride-vinylacetate-vinylalcohol copolymer | 20 | 18 | 20 | 12 | 18 | 18 | 20 | 18 | 20 | 12 | 18 | 18 | 12 |
| Epoxy resin | 3 | 2 | 3 | 2 | 2 | 2 | 3 | 2 | 3 | 2 | 2 | 2 | 2 |
| Cyclohexanone | 20 | 26 | 14 | 26 | 26 | 26 | — | — | — | — | — | — | 5 |
| Methyl ethyl ketone | — | — | — | — | — | — | 20 | 26 | 14 | 26 | 26 | 26 | — |
| Aromatic solvent of high b.p. | 18 | 25 | 13 | 25 | 25 | 25 | — | — | — | — | — | — | 4 |
| Toluene | — | — | — | — | — | — | 18 | 25 | 13 | 25 | 25 | 25 | — |
| Plasticizer | 10 | 12 | 15 | 12 | 12 | 12 | 10 | 12 | 15 | 12 | 12 | 12 | 3 |
| Iriodin ® 522 | 4 | 24 | 24 | 33 | — | — | 4 | 24 | 24 | 33 | — | — | 33 |
| Iriodin ® 500 | — | — | — | — | 24 | — | — | — | — | — | 24 | — | — |
| Iriodin ® 530 | — | — | — | — | — | 24 | — | — | — | — | — | 24 | — |
| Isoindolinone | — | — | 1 | — | — | — | — | — | 1 | — | — | — | — |
| Perylene | 1 | — | — | 5 | — | — | 1 | — | — | 5 | — | — | 1 |
| Phthalocyanine blue | — | 1 | — | — | 1 | 1 | — | 1 | — | — | 1 | 1 | — |
| Dispersion of aluminum powder | — | — | — | — | — | — | — | — | — | — | — | — | — |
| Weight ratio of Iriodin ® to medium | 5.8 | 28.9 | 36.9 | 42.9 | 28.9 | 28.9 | 5.6 | 28.9 | 36.9 | 42.9 | 28.9 | 28.9 | 126.9 |
| Weight ratio of Iriodin ® to resin | 17.4 | 120.0 | 104.3 | 235.7 | 120.0 | 120.0 | 17.4 | 120.0 | 104.3 | 235.7 | 120.0 | 120.0 | 235.7 |

TABLE 2

| | Comparative Example | | | | | | | | | |
|---|---|---|---|---|---|---|---|---|---|---|
| Transfer printing film | N | O | P | Q | R | S | T | U | V | W |
| Type of printing | sc | sc | sc | sc | gr | gr | gr | gr | pa | |
| Vinylchloride-vinylacetate-vinylalcohol copolymer | 20 | 15 | 15 | 15 | 20 | 15 | 15 | 15 | 15 | aluminum vacuum evaporation coated film |
| Epoxy resin | 3 | 2 | 2 | 2 | 3 | 2 | 2 | 2 | 2 | |
| Cyclohexanone | 14 | 26 | 26 | 26 | — | — | — | — | — | |
| Methyl ethyl ketone | — | — | — | — | 14 | 26 | 26 | 26 | 6 | |
| Aromatic solvent of high b.p. | 13 | 26 | 26 | 26 | — | — | — | — | — | |
| Toluene | — | — | — | — | 13 | 26 | 26 | 26 | 5 | |
| Plasticizer | 15 | 10 | 10 | 10 | 15 | 10 | 10 | 10 | 3 | |
| Iriodin ® 522 | 1 | 52 | — | — | 1 | 52 | — | — | 52 | |
| Iriodin ® 500 | — | — | — | — | — | — | — | — | — | |
| Iriodin ® 530 | — | — | — | — | — | — | — | — | — | |
| Isoindolinone | — | — | — | — | — | — | — | — | — | |
| Perylene | 5 | — | 1 | 1 | 5 | — | 1 | 1 | — | |
| Phthalocyanine blue | — | 1 | — | — | — | 1 | — | — | 1 | |
| Dispersion of aluminum powder | — | — | — | 20 | — | — | — | 20 | — | |
| Weight ratio of Iriodin ® to medium | 1.5 | 65.8 | 0.0 | 0.0 | 1.5 | 65.8 | 0.0 | 0.0 | 167.7 | |
| Weight ratio of Iriodin ® to resin | 4.3 | 305.9 | 0.0 | 0.0 | 4.3 | 305.9 | 0.0 | 0.0 | 305.9 | |

TABLE 3

| | Example | | | | | | | | | | | |
|---|---|---|---|---|---|---|---|---|---|---|---|---|
| Transfer printing film | A | B | C | D | E | F | G | H | I | J | K | L | M |
| Appearance | | | | | | | | | | | | |
| Transferability | ○ | ○ | ○ | ○ | ○ | ○ | ○ | ○ | ○ | ○ | ○ | ○ | ○ |
| Tone, luster | ○ | ○ | ○ | ○ | ○ | ○ | ○ | ○ | ○ | ○ | ○ | ○ | ○ |
| Durability | | | | | | | | | | | | |
| Impact test (hitting by club head) | ○ | ○ | ○ | ○ | ○ | ○ | ○ | ○ | ○ | ○ | ○ | ○ | ○ |
| Sand abrasion test | ○ | ○ | ○ | ○ | ○ | ○ | ○ | ○ | ○ | ○ | ○ | ○ | ○ |
| Sand/water abrasion test | ○ | ○ | ○ | ○ | ○ | ○ | ○ | ○ | ○ | ○ | ○ | ○ | ○ |

TABLE 4

|  | Comparative Example | | | | | | | | | |
| --- | --- | --- | --- | --- | --- | --- | --- | --- | --- | --- |
| Transfer printing film | N | O | P | Q | R | S | T | U | V | W |
| Appearance | | | | | | | | | | |
| Transferability | o | Δ | o | Δ | o | Δ | o | Δ | Δ | Δ |
| Tone, luster | Δ | o | x | o | Δ | o | x | o | o | □ |
| Durability | | | | | | | | | | |
| Impact test (hitting by club head) | o | Δ | o | Δ | o | Δ | o | Δ | Δ | Δ |
| Sand abrasion test | o | x | o | x | o | x | o | x | x | x |
| Sand/water abrasion test | o | o | o | o | o | o | o | o | x | x |

As clearly understood from Tables 3 and 4, the transferred marks printed by using transfer printing films of Examples, in comparison with those printed by using conventional films of Comparative Examples, had an equal transferability and far improved in respect of brilliance and luster, preserving a desired durability.

According to the present invention, since the ink composition which contains the component developing and intensifying luster is used for the marking of the golf ball, the marked golf ball of the present invention possesses a novel tone and distinct appearance and would be a commercial product well agreeable to the diversified golf ball market needs.

More particularly, the pigment, the luster developing component, is incorporated in the ink for the marking of the golf ball without use of the metal particles. The pigment consists of the nucleus like a mica and a covering material; which the nucleus of crystal particles having a low light refractive index; and which the covering material coating the circumference thereof uniformly having a light reflectiveness and a high refractive index. The pigment is made to develop the light reflectiveness by a multiplicative effect of the light reflection and the interference effect. As a result, the marked golf ball shines under the sunlight, the printing to the golf ball is easy, and the durability of the mark is preserved sufficiently. Consequently, the ink composition for golf ball and such a golf ball having high durability and the light reflectiveness can be provided.

Japanese Patent Application No. 131702/1998 is incorporated herein by reference.

Although some preferred embodiments have been described, many modifications and variations may be made thereto in the light of the above teachings. It is therefore to be understood that within the scope of the appended claims, the invention may be practiced otherwise than as specifically described.

We claim:

1. A golf ball having a mark of a desired pattern on a surface thereof, said mark having been applied by a transfer technique with an ink composition comprising a luster developing component, which is crystalloid or non-crystalloid nucleus made of at least one of mica, glass flake, BaSO4, SiO2 and synthetic ceramics which is coated with a thin film of a metal oxide or a metal nitride; said ink composition further comprising transparent organic pigments with high visibility.

2. A golf ball as set forth in claim 1, wherein said ink composition contains 15 to 250 parts by weight of said luster developing component relative to 100 parts by weight of an ink resin.

3. A golf ball as set forth in claim 2, wherein said ink composition contains 20 to 150 parts by weight of said luster developing component relative to 100 parts by weight of an ink resin.

4. A golf ball as set forth in claim 1, wherein said ink composition contains 5 to 150 parts by weight of said luster developing component relative to 100 parts by weight of an ink medium.

5. A golf ball as set forth in claim 4, wherein said ink composition contains 10–80 parts by weight of said luster developing component relative to 100 parts by weight of an ink medium.

6. A golf ball as set forth in claim 5, wherein said metal oxide is an iron oxide.

7. A golf ball as set forth in claim 1, wherein said base resin of said ink composition is a thermoplastic resin.

* * * * *